United States Patent
Chinitz et al.

(10) Patent No.: US 10,893,494 B2
(45) Date of Patent: Jan. 12, 2021

(54) SYSTEM AND METHOD FOR SYNCHRONIZING PROTOCOL ANALYZERS DURING WIRELESS TESTING

(71) Applicant: Octoscope Inc., Littleton, MA (US)

(72) Inventors: Leigh Chinitz, Wellesley, MA (US); Donald Simpson, Mountain View, CA (US)

(73) Assignee: OCTOSCOPE INC., Littleton, MA (US)

( * ) Notice: Subject to any disclaimer, the term of this patent is extended or adjusted under 35 U.S.C. 154(b) by 0 days.

(21) Appl. No.: 16/515,786

(22) Filed: Jul. 18, 2019

(65) Prior Publication Data

US 2020/0028905 A1    Jan. 23, 2020

Related U.S. Application Data

(60) Provisional application No. 62/825,418, filed on Mar. 28, 2019, provisional application No. 62/699,838, filed on Jul. 18, 2018.

(51) Int. Cl.
*H04W 56/00*    (2009.01)
*H04L 12/26*    (2006.01)
*H04L 12/861*   (2013.01)

(52) U.S. Cl.
CPC .......... *H04W 56/001* (2013.01); *H04L 43/10* (2013.01); *H04L 43/18* (2013.01); *H04L 43/50* (2013.01); *H04L 49/90* (2013.01)

(58) Field of Classification Search
CPC .......... H04W 56/001; H04W 56/0015; H04W 56/002; H04L 43/10; H04L 69/325; H04L 43/18; H04L 49/90; H04L 43/50; H04J 3/0638
See application file for complete search history.

(56) References Cited

U.S. PATENT DOCUMENTS

| 10,520,534 B1* | 12/2019 | Rowell | H01Q 1/525 |
| 2005/0226195 A1* | 10/2005 | Paris | H04W 28/06 370/338 |
| 2006/0229020 A1* | 10/2006 | Mlinarsky | H04B 17/391 455/67.14 |
| 2008/0151762 A1* | 6/2008 | Armstrong | H04W 24/08 370/241 |
| 2012/0101985 A1* | 4/2012 | Kemp | G06F 16/9535 707/609 |
| 2012/0296996 A1* | 11/2012 | Lehavi | H04L 43/18 709/206 |

(Continued)

*Primary Examiner* — Aaron N Strange
(74) *Attorney, Agent, or Firm* — Intrinsic Law Corp.

(57) ABSTRACT

A computer-implemented method for synchronizing wireless testing devices includes (a) in a first protocol analyzer located in a first RF-isolated test chamber, capturing first network packets transmitted to or from a wireless device-under-test (DUT) to generate first test data, (b) in a second protocol analyzer located in a second RF-isolated test chamber, capturing second network packets transmitted to or from the wireless DUT to generate second test data, (c) synchronizing internal clocks of the first and second protocol analyzers such that the first and second protocol analyzers capture the first and second network packets with respect to a synchronized internal clock time, and (d) merging the first and second test data using the synchronized internal clock time.

35 Claims, 13 Drawing Sheets

(56) References Cited

U.S. PATENT DOCUMENTS

| | | | |
|---|---|---|---|
| 2013/0016739 A1* | 1/2013 | Penisoara | H04W 24/08 |
| | | | 370/512 |
| 2013/0033279 A1 | 2/2013 | Sozanski et al. | |
| 2014/0254647 A1* | 9/2014 | Stott | H04L 43/12 |
| | | | 375/224 |
| 2015/0242294 A1* | 8/2015 | Lapierre | G06F 11/079 |
| | | | 714/37 |
| 2015/0253357 A1* | 9/2015 | Olgaard | G01R 31/3025 |
| | | | 324/750.26 |
| 2017/0223559 A1* | 8/2017 | Kong | H04B 7/0413 |
| 2018/0006745 A1* | 1/2018 | Vanwiggeren | H04B 17/354 |
| 2019/0155327 A1* | 5/2019 | Zaidman | G06F 11/3476 |

\* cited by examiner

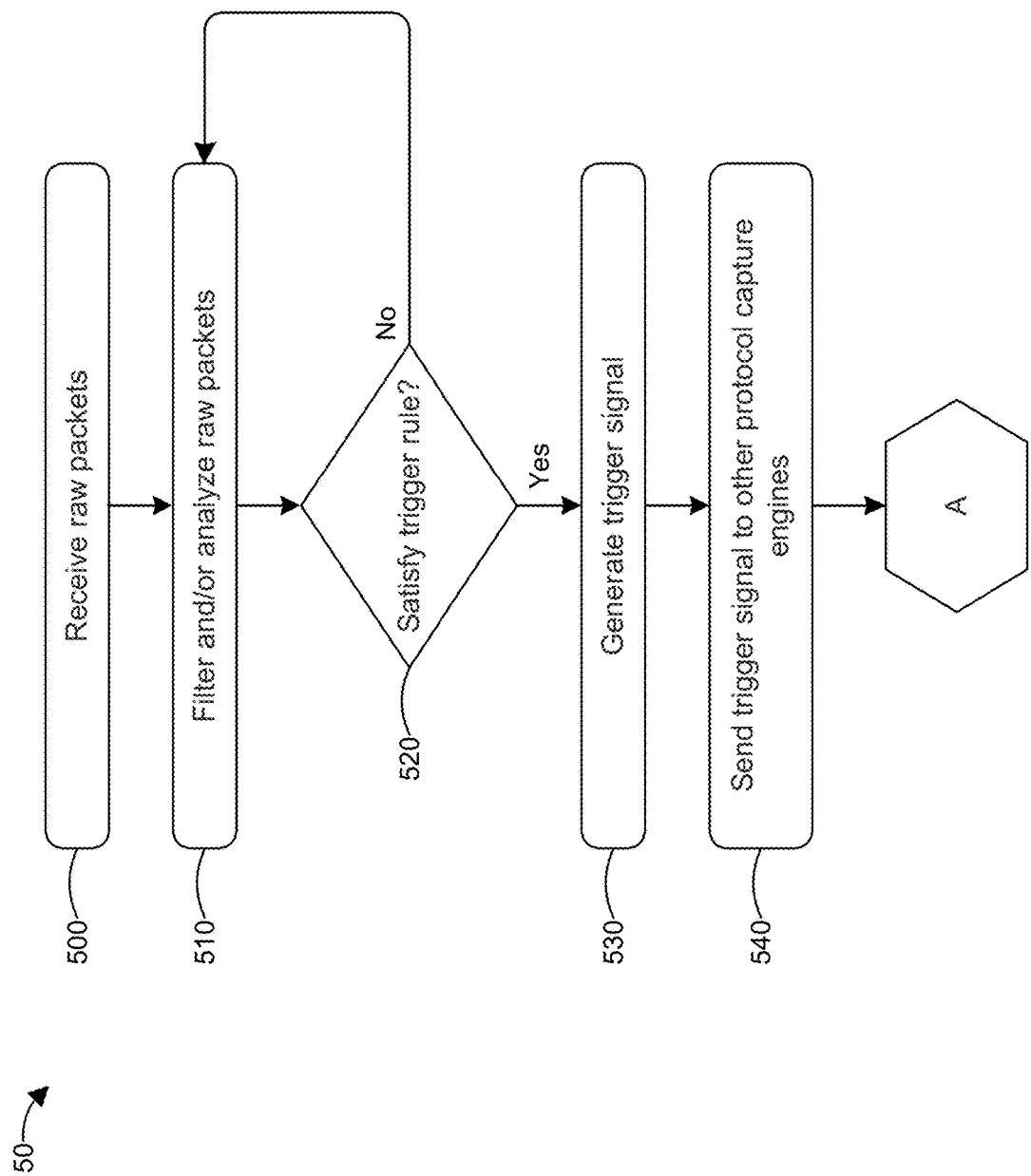

SYSTEM AND METHOD FOR SYNCHRONIZING PROTOCOL ANALYZERS DURING WIRELESS TESTING

CROSS-REFERENCE TO RELATED APPLICATIONS

This application claims priority to U.S. Provisional Application No. 62/825,418, titled "Expert Analyzer," filed on Mar. 28, 2019, and to U.S. Provisional Application No. 62/699,838, titled "Packet Monitoring System and Method Using a Plurality of Packet Sniffers," filed on Jul. 18, 2018, which are hereby incorporated by reference.

TECHNICAL FIELD

The present application relates generally to wireless device testing.

BACKGROUND

The creation of wireless products is challenging, especially in the early stages of development. By definition, teams are working, at that time, with early versions of both hardware and software, and none of the elements has been optimized. Firmware, drivers, and application software are largely untested. And, to add to the challenges, the environment in which the devices are tested is highly dynamic, since that is the nature of wireless communications. On top of all of this, early-stage products may have different interpretations of standards, leading to interoperability challenges that can add to, or mask, the other problems discussed above.

The challenges of new wireless product development are nowhere more obvious than in the development of the latest version of the Wi-Fi set of products, Wi-Fi 6, based on the IEEE 802.11ax amendment to the standard, which requires: (a) higher throughput through the use of higher order modulations, lower per-symbol overhead, and a higher number of MIMO (multiple-input multiple-output) streams; and (b) more efficient handling of airlink resources by using OFDMA (orthogonal frequency division multiple access) to permit simultaneous communication between an access point (AP) and multiple client (or "station" or "STA") devices.

It is this second item that creates some very challenging requirements for Wi-Fi 6. Since Wi-Fi 6 is designed to allow an AP to communicate, simultaneously, with multiple devices, there are very tight time, frequency, and power synchronization requirements that are part of Wi-Fi 6 that are different from what has been the case in Wi-Fi up until now. Multiple station activity is coordinated relative to what is known as a "trigger frame" in Wi-Fi 6, and some requirements surrounding that trigger frame are: (a) absolute and relative transmit power accuracy on the order of a few dB for various device classes, (b) packet arrival time within a ±400 nanosecond window, and (c) carrier-frequency offset compensation such that the residual offset is no more than 350 Hz (this is on the order of 0.07 ppm at 5 GHz).

A classic, initial test of a wireless system would be to look at the system throughput under near-optimal wireless conditions. But even under such conditions, one or more problems may exist in the system that prevent it from performing as expected. For example, a straightforward problem would be that the throughput is much lower than anticipated. More complicated problems could relate to the kinds of requirements discussed above (e.g., timing or frequency correction may be out of specification, OFDMA resource assignments may be wrong, etc.) To understand the root cause of the problem(s), developers need to look everywhere (e.g., the MAC layer, the PHY layer, the RF layer, etc.).

The current state of the art is to use (at least) two separate types of tools to look at the system to try to understand the root cause of the problem(s). One type of tool is a packet sniffer (or protocol analyzer). This tool "speaks" the same language as the technology being developed and is able to capture network packets sent and received by the system. Those packets can then be broken into their component pieces and analyzed for problems. A well-known tool for analyzing packet captures is the Wireshark® analysis tool (available at https://www.wireshark.org/).

While the Wireshark® analysis tool is excellent for analyzing individual packets, the answers to questions about under-performing systems still requires an engineer to make sense of what may be tens of thousands (or more) of packets. Is the system seeing too many retries? Is the expected number of MIMO streams being achieved? Is the PHY data rate too low? If so, why? All of this requires the ability to analyze a large number of packets, and it may even require the ability to look beyond the protocol level, all the way to the basic RF level.

Another type of tool that is commonly used is a vector signal analyzer (or an RF analyzer). This type of tool can measure the known signals, analyze them in terms of magnitude and phase, and then report such quantities as error vector magnitude (EVM), spectral flatness, etc. Additional outputs include constellation diagrams, demodulation error data, signal spectra, and the real-time measured signals.

In existing systems, the protocol analyzer can be used to analyze the application, TCP/UDP/IP, MAC, and PHY layers, and the RF analyzer can be used to analyze the PHY and RF layers.

The difficulty has been in unifying the views that come from these different types of tools. For example, imagine that a developer using a packet sniffer identifies "low PHY data rates" as a possible root cause for a low throughput issue. Is that related to a rate adaptation scheme (a protocol problem), or is it due to a more basic problem of high EVM at the RF layer? Often it is the case that a problem seen in one layer has its root cause in another layer. It is extremely difficult, however, to correlate the information seen in one layer with the information seen at another layer when the data is taken using different tools (e.g., tools designed to sniff at one layer or another), such as using a protocol analyzer and an RF analyzer.

Even in systems where both protocol and RF analyzers may not be required, it is still possible to require multiple analyzers working in conjunction with each other. For example, in complex Wi-Fi networks including not only Access Points, but other elements as well, such as Mesh Access Points, Extenders, etc., it is common to have multiple protocol analyzers sniffing the traffic at these multiple points in the network. So, working with multiple analyzers is not only necessary across different protocol layers, but even within the same protocol layer.

In addition, it is difficult to determine what occurs at each protocol analyzer with respect to a common time. For example, when one protocol analyzer detects a communication signal that corresponds to an event-of-interest, it is useful to determine what the other protocol analyzers detect at the same time as the event-of-interest, prior to the event-of-interest, and/or after the event-of-interest. However, the asynchronous and independent nature of the protocol analyzers and other testing devices makes this difficult to accomplish.

It would be desirable to overcome these and/or other deficiencies in the art.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a computer-implemented method for synchronizing wireless testing devices, comprising: in a first protocol analyzer located in a first RF-isolated test chamber, capturing first network packets transmitted to or from a wireless device-under-test (DUT) to generate first test data; in a second protocol analyzer located in a second RF-isolated test chamber, capturing second network packets transmitted to or from the wireless DUT to generate second test data; synchronizing internal clocks of the first and second protocol analyzers such that the first and second protocol analyzers capture the first and second network packets with respect to a synchronized internal clock time; and merging the first and second captures using the synchronized internal clock time.

In one or more embodiments, the internal clocks are synchronized using a clock synchronization protocol. In one or more embodiments, the clock synchronization protocol comprises a Network Time Protocol. In one or more embodiments, the clock synchronization protocol comprises a Precision Time Protocol. In one or more embodiments, the internal clocks of the first and second protocol analyzers are synchronized to an internal clock of a computer, the computer in network communication with the first and second protocol analyzers.

In one or more embodiments, the first protocol analyzer comprises an in-line probe. In one or more embodiments, the first and second protocol analyzers comprise in-line probes. In one or more embodiments, the first protocol analyzer comprises a monitor probe. In one or more embodiments, the first and second protocol analyzers comprise monitor probes.

In one or more embodiments, the method further comprises, in the first protocol analyzer, generating a trigger output signal when any of the first network packets satisfies a trigger rule. In one or more embodiments, the trigger output signal comprises a start trigger output signal. In one or more embodiments, the trigger output signal comprises a stop trigger output signal. In one or more embodiments, the trigger rule is user-programmable in a scripting language. In one or more embodiments, the method further comprises, prior to determining whether the trigger rule is satisfied, passing the first network packets through a packet analysis filter, the packet analysis filter configured to extract packet information from the first network packets and filter the first packets based on the packet information.

In one or more embodiments, the method further comprises, in a computer in network communication with the first and second protocol analyzers: receiving the first test data from the first protocol analyzer; receiving the second test data from the second protocol analyzer; generating a distributed trigger output signal when the first and second network packets satisfy a distributed trigger rule; and simultaneously sending the distributed output signal to the first and second protocol analyzers.

In one or more embodiments, the distributed trigger output signal comprises a start trigger output signal. In one or more embodiments, the distributed trigger output signal comprises a stop trigger output signal. In one or more embodiments, the distributed trigger rule is user-programmable in a scripting language.

In one or more embodiments, the method further comprises, in a computer in network communication with the first and second protocol analyzers: receiving the first test data from the first protocol analyzer; and merging the first and second captures, using the synchronized internal clock time, at the computer.

Another aspect of the invention is directed to a system for testing wireless devices, comprising: RF-isolated chambers; and a protocol analyzer disposed in each RF-isolated chamber, the protocol analyzers in network communication with each other, wherein internal clocks of the protocol analyzers are time-synchronized according to a time synchronization protocol.

In one or more embodiments, each protocol analyzer is configured to capture network packets transmitted to or from a wireless device-under-test (DUT) to generate test data. In one or more embodiments, the system further comprises, a computer in network communication with the protocol analyzers, wherein: the computer receives the test data from each protocol analyzer, and the computer merges the test data using the synchronized internal clocks. In one or more embodiments, the computer is configured to: determine whether any of the network packets in the merged test data satisfy a distributed trigger rule, and simultaneously send a distributed trigger output signal to the protocol analyzers when the distributed trigger rule is satisfied. In one or more embodiments, the computer sends the distributed trigger output signal to the protocol analyzers via trigger lines. In one or more embodiments, the distributed trigger rule is user-programmable in a scripting language.

In one or more embodiments, the protocol analyzers comprise a first protocol analyzer and one or more additional protocol analyzers, and the first protocol analyzer is configured to: determine if any of the network packets captured by the first protocol analyzer satisfies a trigger rule, and simultaneously send a trigger output signal to the one or more additional protocol analyzers when the trigger rule is satisfied. In one or more embodiments, the first protocol analyzer sends the trigger output signal to the one or more additional protocol analyzers via one or more trigger lines. In one or more embodiments, the trigger output signal comprises a start trigger output signal. In one or more embodiments, the trigger output signal comprises a stop trigger output signal. In one or more embodiments, the trigger rule is user-programmable in a scripting language.

In one or more embodiments, the first protocol analyzer further comprises a packet analysis filter configured to extract packet information from the first network packets and filter the first network packets based on the packet information. In one or more embodiments, the packet analysis filter has a filtered network packet output and the first protocol analyzer determines if any of the first network packets in the filtered network packet output satisfies the trigger rule.

BRIEF DESCRIPTION OF THE DRAWINGS

For a fuller understanding of the nature and advantages of the present concepts, reference is made to the following detailed description of preferred embodiments and in connection with the accompanying drawings.

DETAILED DESCRIPTION

Figure 1:
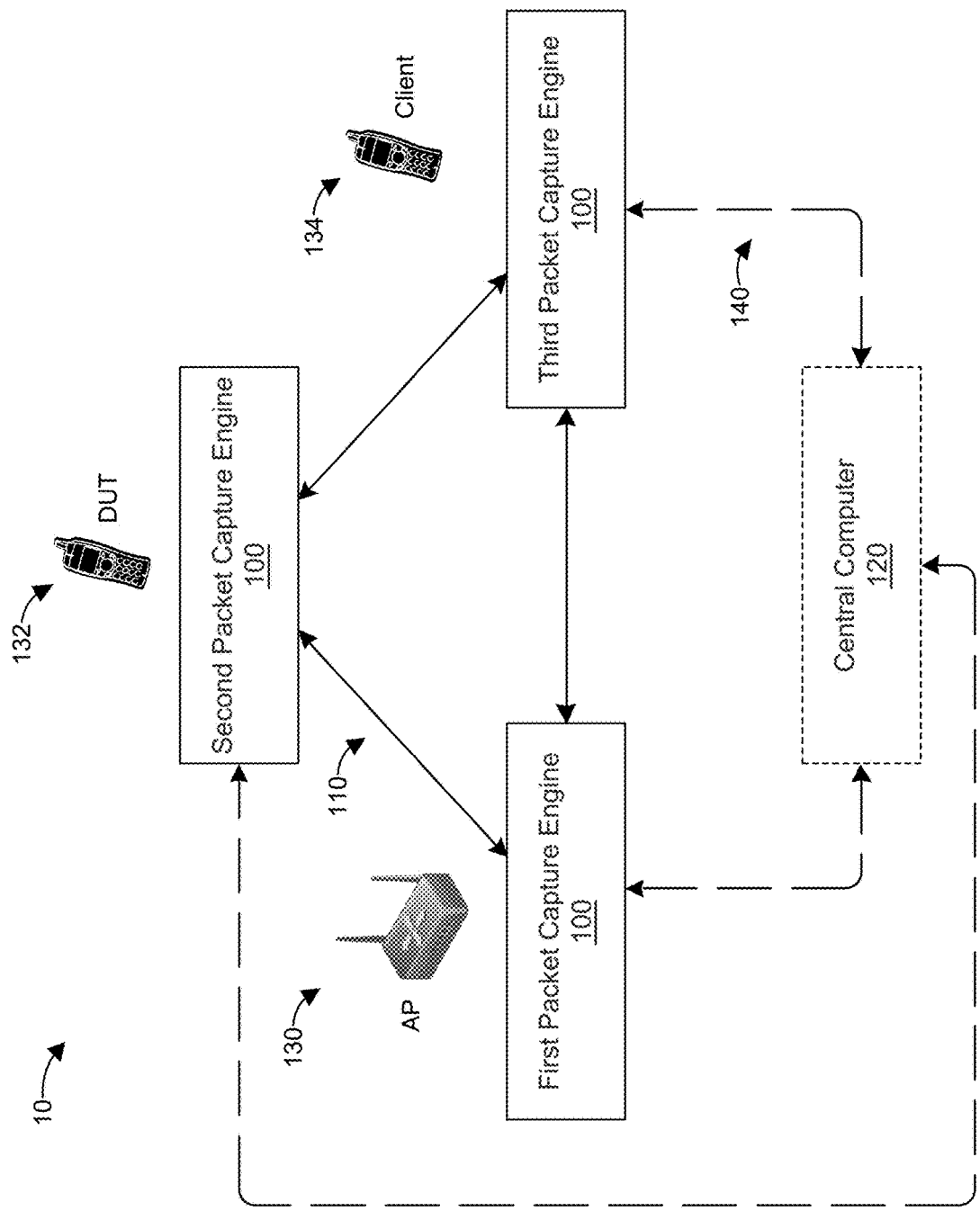
FIG. 1 is block diagram of a system for the simultaneous and synchronized capture of network packets during wireless device testing according to one or more embodiments.

FIG. 1 is block diagram of a system 10 for the simultaneous and synchronized capture of network packets during wireless device testing according to one or more embodiments. The system 10 includes multiple packet capture engines 100 that are each in wireless communication with a respective piece of network equipment (e.g., a wireless device). For example, a first packet capture engine 100 is in wireless communication with a wireless access point (AP) 130, a second packet capture engine 100 is in wireless communication with a wireless device-under-test (DUT) 132, and a third packet capture engine 100 is in wireless communication with a wireless client device 134. The packet capture engines 100 can comprise a protocol analyzer (or protocol sniffer), an RF analyzer (or RF sniffer), and/or another packet capture device.

During testing, the AP 130, DUT 132, and client device 134 are in wireless communication with each other. In addition, the AP 130, DUT 132, and client device 134 are located in respective RF-isolated chambers to provide a controlled RF environment in which RF noise and other variables can be introduced or emulated during testing. The wireless communication sent to and from each wireless device (e.g., the AP 130, DUT 132, and client device 134) is monitored and collected as test data by a corresponding packet capture engine 100. The test data can be useful to determine the root cause of a problem that may occur during testing, such as low data throughput.

The packet capture engines 100 are in wireless communication with the respective wireless devices (e.g., the AP 130, DUT 132, and client device 134). When the wireless devices are located in RF-isolated chambers, the packet capture engines 100 can be located externally to the RF-isolated chambers and can be electrically coupled to a shielded coaxial cable that extends to an RF feed-through port that passes through one of the RF-isolating chamber walls. The RF feed-through port is further coupled to an antenna located in the RF-isolated chamber. Alternatively, the packet capture engines 100 can be located within the respective RF-isolated chambers. In this case, each packet capture engine 100 is coupled to a shielded coaxial cable that extends to an antenna in the corresponding chamber. An RF feed-through port is not needed to electrically couple the packet capture engine 100 to the antenna when the packet capture engine 100 is located within the RF-isolated chamber. In some embodiments, one or more packet capture engines 100 is/are located externally to the RF-isolated chamber(s) and one or more packet capture engines 100 is/are located within the RF-isolated chamber(s). Additional details regarding placing a packet capture engine 100 inside an RF-isolated test chamber are disclosed in U.S. Provisional Application No. 62/699,878, titled "Integrated Wireless Communication Test Environment," filed on Jul. 18, 2018, and the non-provisional U.S. patent application(s) that claim priority thereto, which are hereby incorporated by reference.

Figure 2:
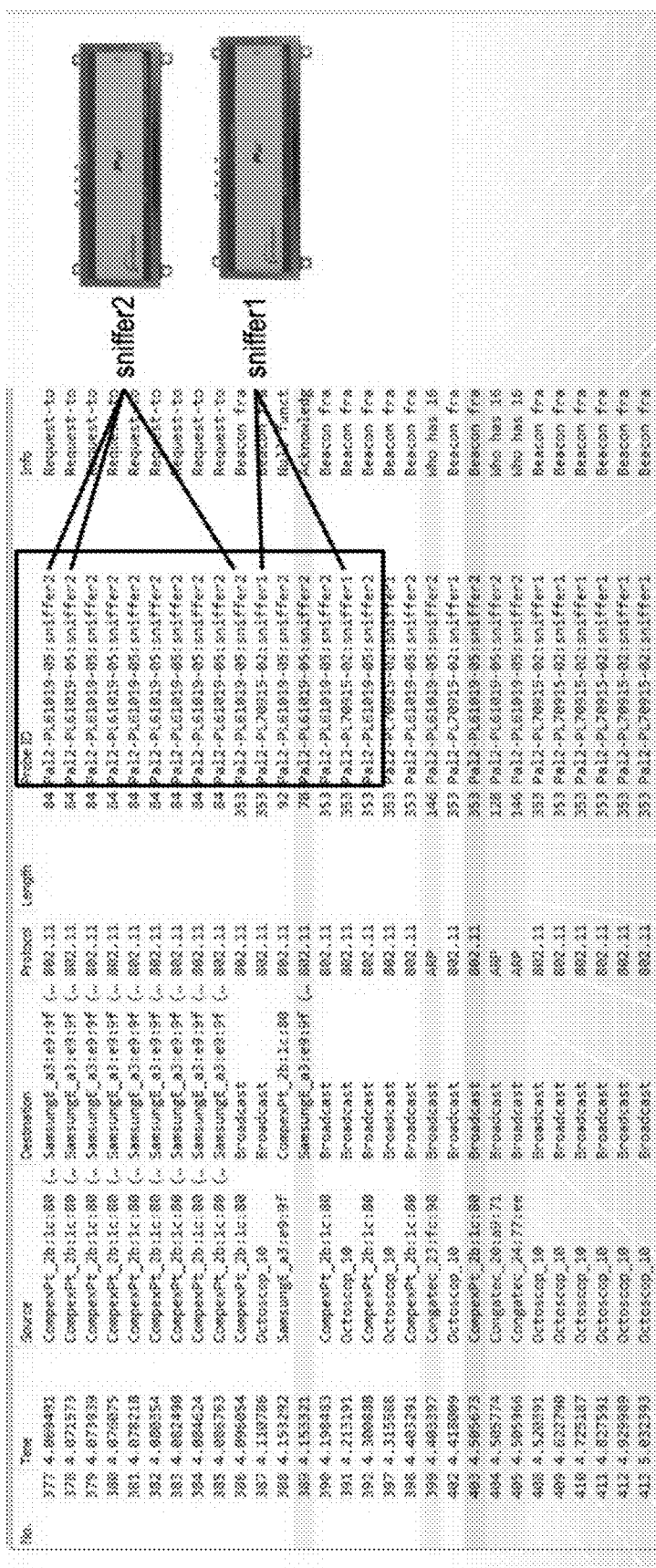
FIG. 2 illustrates a common test data set that includes packets captured by multiple packet capture engines.

The packet capture engines 100 are in electrical communication with one another via communication links 110, which can comprise wired communication links and/or wireless communication links. The communication links 110 can be used to synchronize the packet capture engines 100. For example, the internal clocks of the packet capture engines 100 can be synchronized using a clock synchronization protocol such as Precision Time Protocol (e.g., PTPv2 or IEEE 1588v2) or Network Time Protocol (e.g., NTPv4) based on a master internal clock, which can be the internal clock of one of the packet capture engines 100 or another internal clock (e.g., of a computer in network communication with the packet capture engines 100). Internal clock synchronization can be used to time-align the packets captured by the packet capture engines 100, for example to merge them into a common test data set that includes packets captured by multiple (or all) packet capture engines 100, for example as illustrated in FIG. 2 for two sniffers (e.g., packet capture engines 100).

To merge, the packet capture engines 100 send the respective collected test data (e.g., capture of network packets) to a central computer 120 (e.g., a server, a laptop computer, a desktop computer, or another computer) to merge the test data (e.g., captured network packets) based on the synchronized internal clocks of the packet capture engines 100. Alternative, the packet capture engines 100 can send the respective collected test data (e.g., capture of network packets) to the first packet capture engine 100 (or second or third packet capture engine 100) to merge the test data (e.g., captured network packets) based on the synchronized internal clocks of the packet capture engines 100.

Additionally or alternatively, the communication links 110 can be used to send (e.g., simultaneously send) a trigger output signal from one packet capture engine 100 to some or all of the other packet capture engines 100. The trigger output signal can be generated when the packet capture engine 100 detects that one or more predetermined events and/or conditions have occurred based on wireless communication to and/or from the wireless device that the packet capture engine 100 is monitoring. The predetermined event(s) and/or condition(s) can occur simultaneously, sequentially, consecutively, and/or can have another temporal relationship. The predetermined events and/or conditions that determine when a trigger output signal is to be generated can be stored locally in or remotely from the packet capture engine 100 as trigger rules. For example, the trigger output signal can be generated when the first packet capture engine 100 detects that wireless communication to and/or from the AP 130 satisfies a first trigger rule. An example of a first trigger rule can be when the DUT 132 sends a first packet type (e.g., an acknowledgment (ACK) packet) to the AP 130. The first packet capture engine 100 can detect the first packet type in real time and can generate the trigger output signal when the first packet type is detected. Additional details of the trigger output signal are described herein.

The trigger output signal can be used to synchronize the simultaneous capture of test data by multiple packet capture engines 100. For example, the trigger output signal can be used to synchronize (a) the simultaneous capture of protocol data by multiple (e.g., two or more) protocol analyzers and/or (b) the simultaneous capture of protocol and RF-layer data by one or more protocol analyzer(s) and by one or more RF analyzers. The trigger output signal can include a "start" trigger output signal that instructs the packet capture engines 100 to start collecting or saving (e.g., to internal or external memory) test data upon receipt of the start trigger signal. The trigger output signal can also indicate the length of time for each packet capture engine 100 to acquire test data. Additionally or alternatively, the packet capture engines 100 can acquire test data until they receive a "stop" trigger output signal (e.g., from the first packet capture engine 100 that generated the trigger output signal or from another packet capture engine 100). As such, the trigger output signal can include a start trigger output signal and/or a stop trigger output signal to instruct the protocol capture engines 100 to start and stop test data acquisition, respectively.

In some embodiments, a "distributed" trigger output signal can be created when a distributed trigger rule has been satisfied. The distributed trigger rule can correspond to a predetermined combination of events and/or conditions at multiple wireless devices (e.g., a combination of any of the AP 130, DUT 132, and/or client device 134). The predetermined combination of events and/or conditions can occur simultaneously, sequentially, consecutively, and/or can have another temporal relationship. For example, a distributed trigger output signal can be created when the first packet capture engine 100 detects a first event or condition at the AP 130 and the second packet capture engine 100 detects a second event or condition at the DUT 132. In another example, a distributed trigger output signal can be created when the first packet capture engine 100 detects a first event or condition at the AP 130, the second packet capture engine 100 detects a second event or condition at the DUT 132, and the third packet capture engine 100 detects a third event or condition at the client 134. Other combinations are possible.

In some embodiments, each packet capture engine 100 can share (e.g., via communication links 110) the detection of events and/or conditions (or the collected raw test data) with the other packet capture engines 100, and one or more of the packet capture engines 100 can determine whether a distributed trigger rule has been satisfied. In one example, one of the packet capture engines 100 can have a master-slave relationship where one of the packet capture engines 100 (e.g., the first packet capture engine 100) is designated as the master, for purposes of determining whether a distributed trigger rule has been satisfied, and the other packet capture engines 100 (e.g., the second and third packet capture engines 100) are designated as slaves. In this example, only the packet capture engine (e.g., the first packet capture engine 100) determines whether a distributed trigger rule has been satisfied. In another example, the packet capture engines 100 (e.g., some or all of the packet capture engines 100) that detect whether a trigger rule has been satisfied are ranked hierarchically so that in the event that multiple packet capture engines 100 detect multiple trigger rules simultaneously, only the trigger rule generated by the highest-ranked packet capture engine 100 is followed to avoid conflict. Additionally or alternatively, the trigger rules themselves can be ranked hierarchically so only the highest-ranked trigger rule is followed.

In another embodiment, the packet capture engines 100 can share the detection of events and/or conditions (or the collected raw test data) with the central computer 120 via communication links 140. The central computer 120 can then analyze the detected events and/or conditions (or the collected raw test data which can include the merged test data discussed above) from each packet capture engine 100 to determine whether a distributed trigger rule has been satisfied. The distributed trigger rules can be stored locally on the central computer 120 or in memory or in a server that is remote from the central computer 120 but in network communication therewith. When the central computer 120 determines that a distributed trigger rule has been satisfied, the central computer 120 can send (e.g., simultaneously send) a distributed trigger output signal to some or all of the packet capture engines 100 via the corresponding communication links 140. Alternatively, the central computer 120 can send a distributed trigger detection signal to one of the packet capture engines 100, which can then send a distributed trigger output signal to the other packet capture engines 100. The distributed trigger signal and the distributed trigger detection signal can each include a distributed "start" trigger output signal and/or a distributed "stop" trigger output signal, as discussed above with respect to the trigger signal output by the packet capture engine(s) 100.

Figure 3:
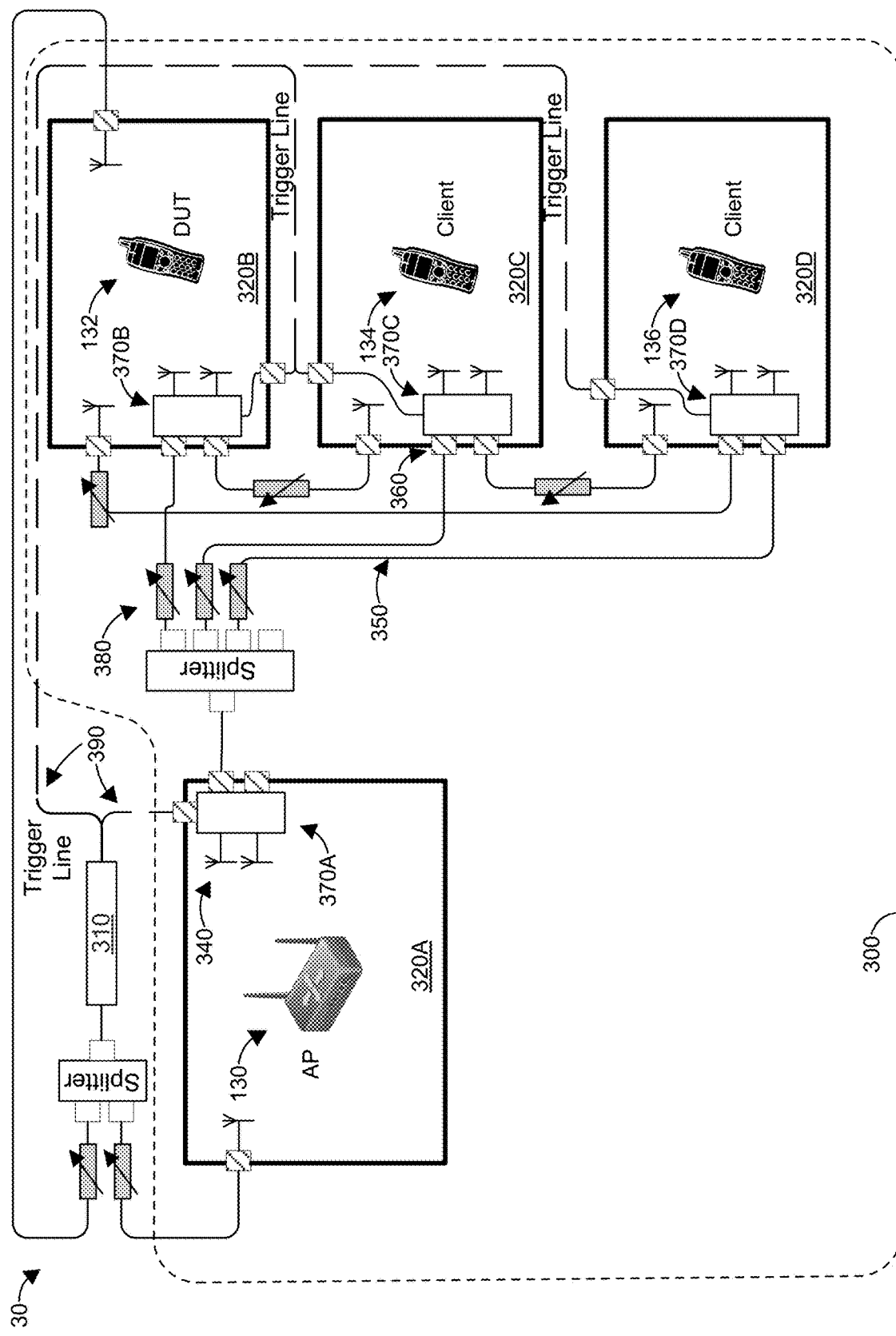
FIG. 3 is a schematic diagram of a system for the simultaneous and synchronized capture of network packets during wireless device testing according to one or more embodiments.

FIG. 3 is a schematic diagram of a system 30 for the simultaneous and synchronized capture of network packets during wireless device testing according to one or more embodiments. The system 30 includes a wireless testing environment 300 that is electrically coupled to an RF analyzer 310.

The wireless testing environment 300 includes RF-isolated semi-anechoic testing chambers 320A-D (in general, chamber 320). Each chamber 320 is RF-isolated from the rest of the wireless testing environment 300 and from the other chambers 320. A piece of network equipment is disposed in each chamber 120A-D. For example, an AP 130 is disposed in chamber 320A, a DUT 132 is disposed in chamber 320B, and clients 134, 136 are disposed in chambers 320C and 320D, respectively. In some embodiments, each client 134, 136 can include multiple devices. The AP 130, the DUT 132, and the clients 134, 136 can wirelessly communicate with each other through high-gain antennas 340 located in respective chambers 320. The antennas 340 are electrically coupled to one another via wired connections 350 (e.g., shielded coaxial cables or RF cables), which extend through RF-insulated ports 360 in the chamber walls. The antennas 340 and wired connections 350 can be used to distribute signals between various elements of the test setup, for example between each chamber 320 (e.g., to/from the network equipment disposed therein), between the RF analyzer 110 and the chambers 320A-B (e.g., to/from the network equipment disposed therein), between protocol analyzers 370A-D (in general, protocol analyzer(s) 370), and between the RF analyzer 310 and the protocol analyzers 370. The signals sent between the protocol analyzers 370 and/or between the protocol analyzers 370 and the RF analyzer 310 can be used to synchronize their respective internal clocks.

The protocol analyzer 370 can include logic and/or other functionalities/features. For example, the protocol analyzers 170 can be configured to function as a testbed AP and/or a testbed client. In some embodiments, the protocol analyzer 170 can function as a WiFi-6 test device such as the Pal-6® test instrument available from octoScope, Inc. The Pal-6® test instrument can also be configured as a WiFi or as a Bluetooth test device.

The wireless testing environment 300 can also include programmable attenuators 380, a traffic generator, interface generators, and multipath emulators. The programmable attenuators 380 can be used to create RF separation and to emulate motion between the DUT 132 and one or more clients 134, 136, and/or to emulate motion between the AP 130 and one or more clients 134, 136. The traffic generator can be used to create traffic streams between various endpoints in the test. The interference generators can be used to create controlled interference during the test. The multipath emulators can be used to emulate the effect of a particular multipath environment within which the DUT 132 can be located. An example of a multipath emulator is disclosed in U.S. Pat. No. 9,130,667, titled "Radio Frequency Multipath Channel Emulation System and Method," which is hereby incorporated by reference.

In some embodiments, the wireless testing environment 300 comprises an octoBox® wireless personal testbed available from octoScope, Inc. Additional details of the octoBox® wireless personal testbed are disclosed in U.S. Patent Application Publication No. 2013/0033279, titled "Electromagnetic Test Enclosure," published on Feb. 7, 2013, which is hereby incorporated by reference.

The wireless testing environment 300 can support one or more of the following tests: (a) RvR (data rate-vs-range), (b) RvR with rotation if a turntable is included, (c) RvRvO (data rate-vs-range-vs-orientation) or RvOvR (data rate-vs-orientation-vs-range) if a turntable is included in the electromagnetically-isolated chamber, (d) band steering, (e) packet capture, (f) synchronized captures between one or more protocol analyzers 370 and the RF analyzer 310, (g) synchronized captures between the protocol analyzers 370, and/or (h) other test(s) known in the art.

The RF analyzer 310 is in electrical communication with the AP 130 and DUT 132 via wired connections 350 that extend to antenna modules 340 disposed in chambers 320A, 320B, respectively. In some embodiments, the RF analyzer 310 can be also be in communication with clients 134, 136 via wired connections 350 that extend to antenna modules 340 disposed in chambers 320C, 320D, respectively. The RF analyzer 310 can be an IQxel-MW™ Connectivity test system (available from LitePoint Corp.) which can deliver high-performance verification of multiple wireless technologies including Wi-Fi 6 (IEEE 802.11ax), all IEEE 802.11 specifications including IEEE 802.11a/b/g/n/p/ac/ah/af/j, and other wireless connectivity standards such as Bluetooth, DECT, and ZigBee. The IQxel-MW™ Connectivity test system can provide high-quality error vector magnitude (EVM) performance, which can ensure precise analysis of the devices' modulation accuracy. In addition, the IQxel-MW can include multiple vector signal generators and vector signal analyzers that can be internally synchronized (e.g., for MIMO test scenarios).

Each protocol analyzer 370 can decode packets in real-time. Each protocol analyzer 370, in fact, can stream the decoded packets to external storage, making its ability to capture packets virtually unlimited. The RF analyzer 310 does not typically have this ability. RF analyzers, capturing raw I/O samples, require much more memory for each packet than do protocol analyzers, which store only the decoded packet information. While protocol analyzers can store packets from seconds or even minutes of traffic in a memory buffer, RF analyzers can usually store data from much shorter capture periods (e.g., one second or less) in a memory buffer.

This difference between protocol analyzers and RF analyzers makes it difficult for them to capture packets over the same capture period. Since protocol analyzers and RF analyzers cannot store test data from the same capture period length, it is advantageous to synchronize data capture to ensure that the RF analyzer and the RF analyzer(s) acquire test data simultaneously (e.g., over the same time period).

The protocol analyzers 370 are in electrical communication with each other and with the RF analyzer 310 via trigger lines 390 which can include wired communication lines (e.g., RF cables). The trigger lines 390 can be used to send (e.g., simultaneously send) a trigger output signal from one of the protocol analyzers 370 to the other protocol analyzers 370 and/or to the RF analyzer 310. The trigger output signal can be used to synchronize (a) the simultaneous capture of protocol data by multiple (e.g., two or more) protocol analyzers 370 and/or (b) the simultaneous capture of protocol and RF-layer data by one or more protocol analyzer(s) 370 and by the RF analyzer 310, respectively. In some embodiments, the trigger output signal can indicate the time length for each tool to acquire test data. Alternatively, tools can acquire test data until they receive a stop signal from the protocol analyzer 370 (e.g., from the same protocol analyzer 370 that generated the trigger output signal or another protocol analyzer 370). As such, the trigger output signal can include a start trigger output signal and a stop trigger output signal to instruct the packet capture engines (e.g., protocol analyzers 370 and/or RF analyzer 310) to start and stop test data acquisition, respectively.

The trigger output signal can be generated using the line-rate analysis capabilities of the protocol analyzer 370 based on one or more trigger rules. Additionally or alternatively, the trigger output signal can be generated by analyzing the RF-level data (e.g., I/O data) collected by the RF analyzer 310 and to determine if the RF-level data satisfies one or more trigger rules. The trigger rules can be user-generated and/or they can be automatically generated (e.g., as a result of machine learning). For example, the trigger rules can be based on packet types.

For example, suppose that the engineers want to be able to examine specific types of packets such as beacons. Rather than trying to set up a case in which beacons will be sent and the RF analyzer 310 and/or the protocol analyzers 370 will, hopefully, capture them, we can use the fact that the protocol analyzers 370 can recognize a beacon packet, and can trigger the RF analyzer 310 and/or the other protocol analyzers 370 to save the data from exactly the time that the beacon packet was detected. In another example, the trigger rules can be based on error conditions. It may be useful to be able to see what is happening at the RF layer when specific errors, such as cyclic redundancy check (CRC) errors, occur. Since the protocol analyzer 370 can "see" the CRC errors in real time, the protocol analyzer 370 is able to trigger the RF analyzer 310 and/or the other protocol analyzers 370 to save their data at the appropriate time. Other examples of trigger rules can be based on association and/or authentication, probe requests and/or probe responses, trigger frames, Block Acks (block acknowledgments), RTS (request to send), CTS (clear to send), FCS (frame check sequence) pass/fail, beacons, MAC address(es), other MAC and/or PHY parameters.

The trigger output signal can include a hardware trigger output signal and/or a software trigger output signal. A hardware trigger output signal can include a logic signal sent from one of the protocol analyzers 370 to the other protocol analyzers 370 and/or to the RF analyzer 310 via trigger lines 390 (e.g., coaxial connectors). A software trigger output signal can include an Ethernet transmission (e.g., packet) sent to a designation address that indicates that a triggered condition has occurred. The software trigger output signal can be sent to the other protocol analyzers 370 and/or to the RF analyzer 310 via the trigger lines 390 and/or via the antennas 340 and wired connections 350.

In an aspect, the protocol analyzers 370 capture wireless test data from (e.g., only from) a first network protocol layer (e.g., the application, TCP/UDP/IP, or MAC layer) and the RF analyzer 310 captures wireless test data from (e.g., only from) a second network protocol layer (e.g., the RF layer) that is different than the first network protocol layer. Thus, the trigger output signals can be used to synchronize the collection of wireless test data from packet capture engines that operate in different network protocol layers.

Figure 4:
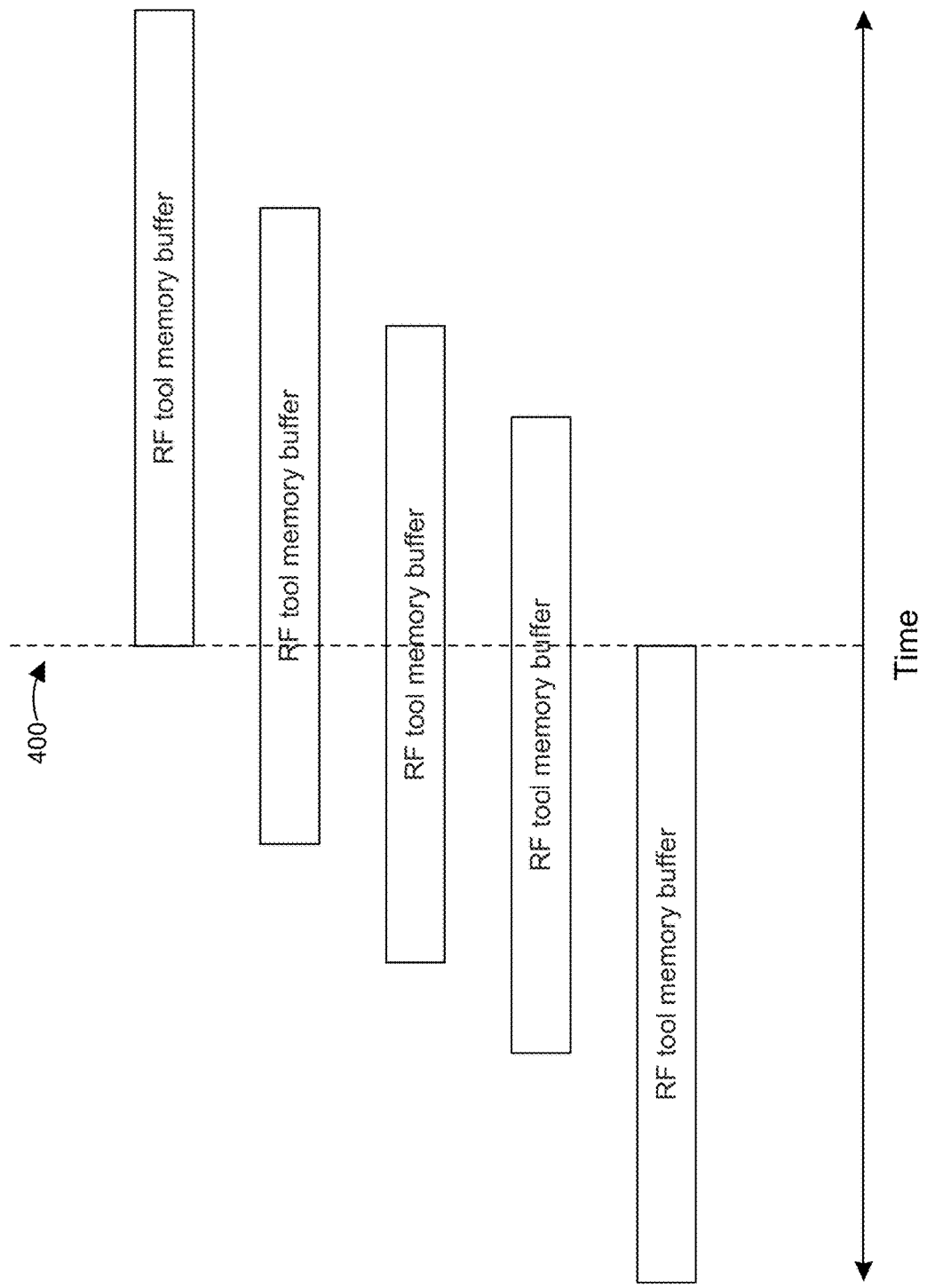
FIG. 4 is a block diagram that illustrates the information stored in the buffer of an RF analyzer with respect to trigger signal according to one or more embodiments.

To debug the DUT, it may be useful to analyze protocol and/or RF-layer data from a time period before and/or after the occurrence of a condition or event that satisfied the trigger rule. This is more challenging for RF-layer data since the RF analyzer can only store data over for a limited time period before that data is overwritten with new data. In some embodiments, when the protocol analyzer detects a trigger condition, the protocol analyzer can trigger the RF analyzer to save the data in its buffer, and this saving process can be configurable. For example, the RF analyzer may save everything that is already in its buffer, it may save everything that enters its buffer after the trigger arrives, or it may do something in between. This is illustrated in FIG. 4, in which the information in the buffer in shown changing over time with respect to trigger output signal 400. The trigger output signal 400 occurs at a specific time, and the saved information may be what is already in the buffer, what is about to be in the buffer, or some combination.

In some embodiments, the protocol analyzers 370 capture wireless test data from (e.g., only from) a first network protocol layer (e.g., the application, TCP/UDP/IP, or MAC layer) and the RF analyzer 310

The trigger output signal 400 can include information regarding which information, if any, in the buffer should be saved by the RF analyzer. In some embodiments, the information to store or not store in the RF analyzer buffer is variable based on the trigger rule. The configuration of what data in the RF analyzer buffer to save pre- and/or post-triggering can be set via an API (e.g., an API to the protocol analyzer or an API to the RF analyzer).

In some embodiments, the RF analyzer 310 and the protocol analyzers 370 are in network communication with a central computer (e.g., central computer 120) which can merge the test data from the protocol analyzers 370 or from the RF analyzer 310 and the protocol analyzers 370. In addition, the central computer can determine whether the events and/or conditions a two or more protocol analyzers 370 and/or at the RF analyzer 310 and at least one protocol analyzer 370 satisfy a distributed trigger rule.

Figure 5:
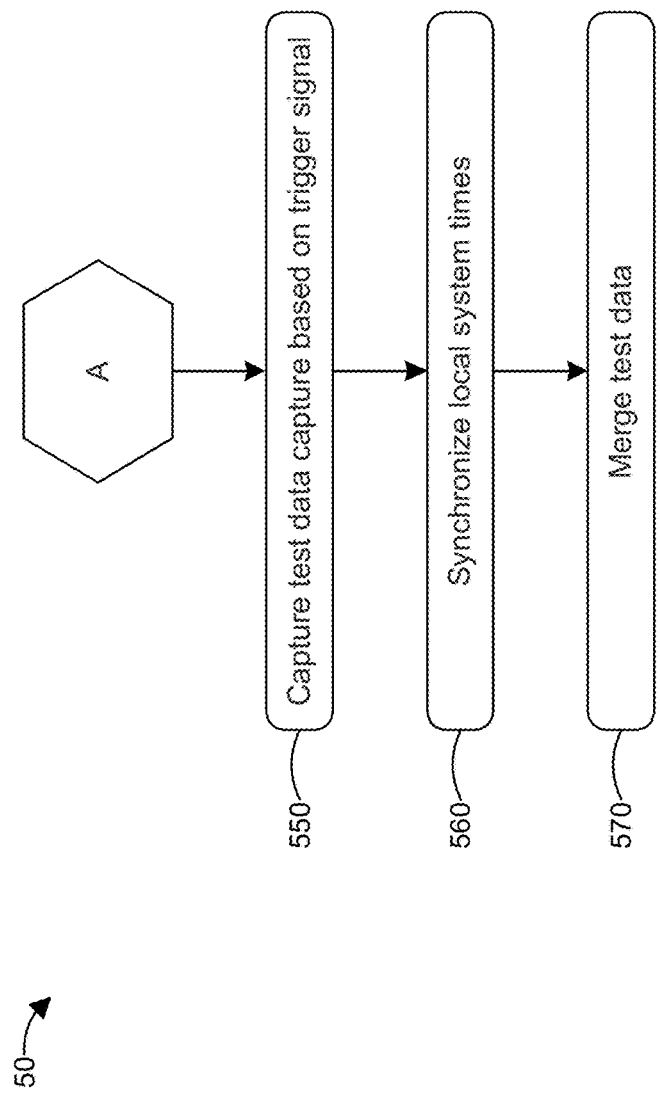
FIG. 5 is a flow chart of a method for synchronizing and/or triggering packet capture engines according to one or more embodiments

FIG. 5 is a flow chart 50 of a method for synchronizing and/or triggering packet capture engines according to one or more embodiments. In step 500, a protocol analyzer receives raw network packets during the testing of a DUT. In step 510, the protocol analyzer filters and/or analyzes the captured raw packets to provide an initial classification of the captured raw packets. For example, the packet analysis and filter can extract minimal and formatted info from each packet that can be processed easily (e.g., by a trigger script to determine if a trigger rule is satisfied). This information can include the packet type, source address, destination address, frame check sequence (FCS), etc. of the filtered packets. The packet analysis and filter can also remove packets to alleviate trigger script processing, and it can filter expressions in the packets (e.g., to/from MAC, packet types, FCS error, etc.). In some embodiments, step 510 can be optional.

In step 520, the protocol analyzer (or a computer in electrical communication therewith) determines if any of the captured packets satisfy one or more trigger rules. A trigger rule can correspond to an event and/or a condition that occurs during testing of the DUT. For example, the event and/or condition (or multiple events and/or conditions) can include an error, a request or command sent from one device (e.g., the AP) to another device (e.g., the DUT), a packet type (e.g., a beacon packet), data rate below a threshold value, and/or another event or condition (e.g., as described herein). In some embodiments, the trigger rule can correspond to a combination of events and/or conditions that occurs at multiple devices (e.g., clients 132, 134, 136 and/or APs 13), such as events and/or conditions that occur simultaneously, sequentially, consecutively, and/or that have another temporal relationship.

When a trigger rule is not satisfied, the flow chart 50 returns to step 510 in a loop to filter and/or analyze additional raw packets and to determine whether any of the additional raw packets satisfy a trigger rule in step 520.

When a trigger rule is satisfied, the flow chart 50 proceeds to step 530 where the protocol generator generates a trigger output signal (e.g., a hardware and/or a software trigger output signal). In step 540, the trigger output signal is simultaneously sent to the other protocol capture engines (e.g., to the other protocol analyzers and/or to the RF analyzer), for example via trigger lines and/or via the antennas and wired connections in the test environment.

In step 550 (via placeholder A in FIG. 5), each protocol capture engine captures test data based on the trigger output signal. For example, each protocol capture engine can begin collecting and storing test data upon receipt of the trigger output signal. The trigger output signal can include a buffer time offset that determines which information (e.g., previously-captured and/or subsequently-captured test data), if any, in the memory buffer of the protocol capture engine should be saved.

In step 560, the local system time of each protocol capture engine is synchronized. The local system times can be synchronized using a time synchronization protocol such as NTP or PTP. In some embodiments, only the local system times of the protocol analyzers are synchronized in step 560. In addition, step 560 can occur before or after any of the steps in FIG. 5, and/or can occur periodically or continuously.

Synchronizing the local system time can allow the test data acquired by each protocol capture engine to be merged into a single test data output file in step 570. When the local system times are synchronized or aligned, the local system time can be used as a common reference time to identify the packets that each protocol capture engine collected with respect to the trigger event or condition. For example, the synchronized/aligned local system time can be used to identify the packets (e.g., collected from the other protocol capture engines such as the other protocol analyzers) that were collected at the same time as the event or condition that met the trigger rule, and/or the packets that were collected before or after the event or condition that met the trigger rule.

Additionally or alternatively, the protocol capture engines (e.g., the protocol analyzers and/or the RF analyzers) can synchronize their local system times using the trigger output signal.

In some embodiments, merging the test data includes determining whether a network packet captured by each protocol capture engine is the same. This can be useful, for example, to align the test data collected by the protocol analyzer(s) and the test data collected by the RF analyzer where it is difficult to synchronize local system times. In some embodiments, determining whether network packets captured by the protocol analyzer(s) and the RF analyzer are the same can be performed instead of synchronizing the local system times of the protocol analyzer(s) and the RF analyzer.

Figure 6:
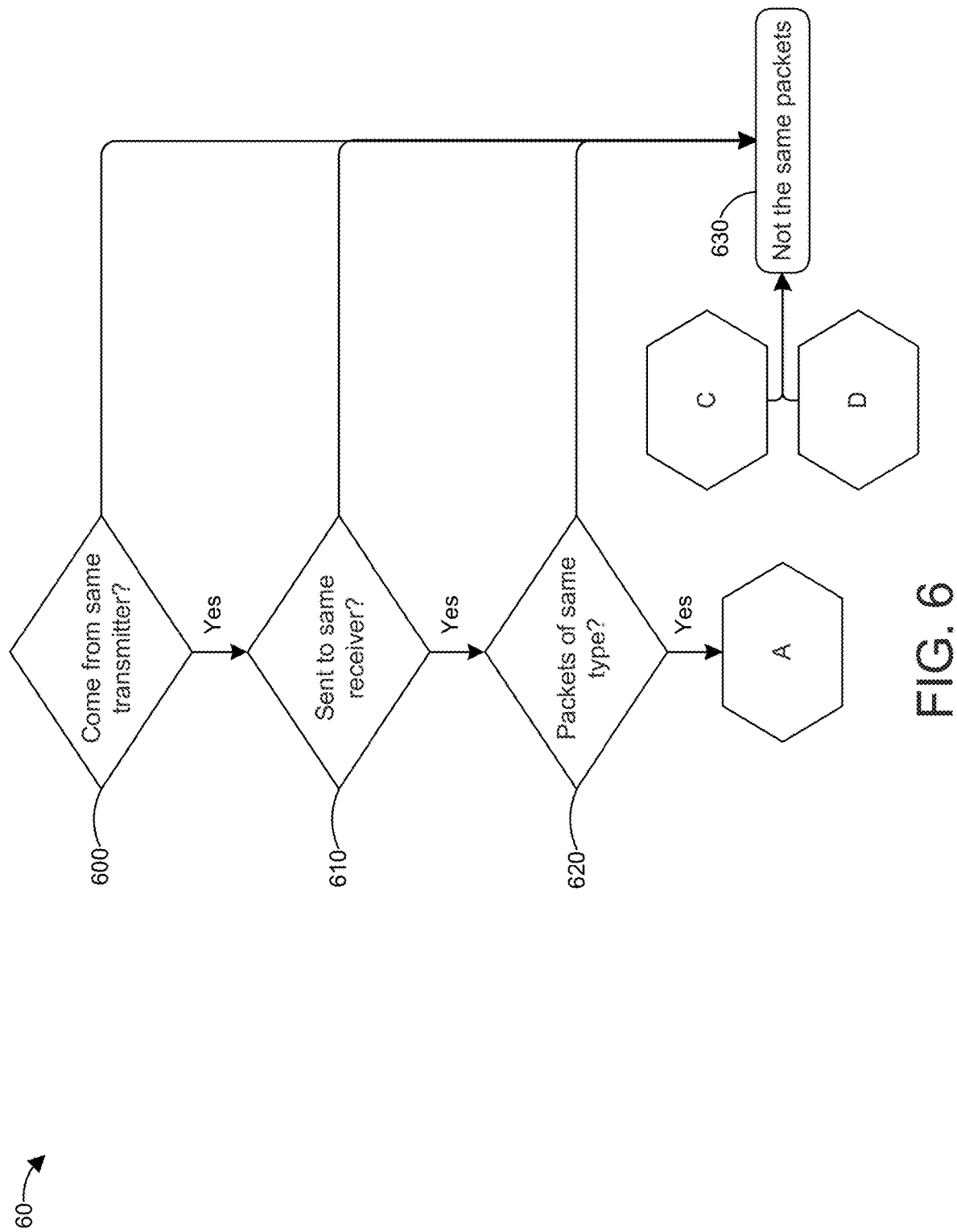
FIG. 6 is a flow chart of a method for determining whether first and second network packets captured by first and second protocol capture engines, respectively, are the same according to an example embodiment.
Figure 6:
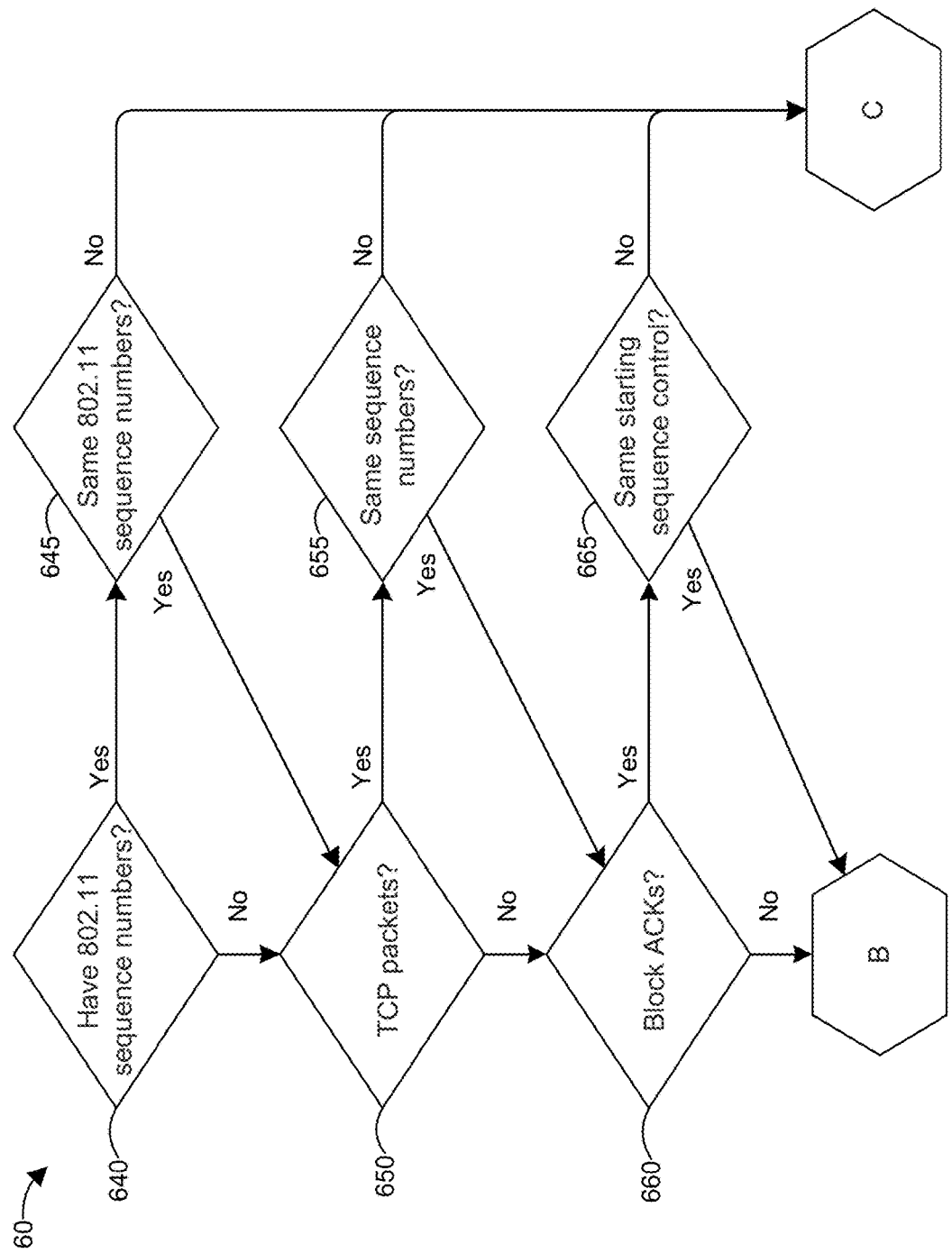
Figure 6:
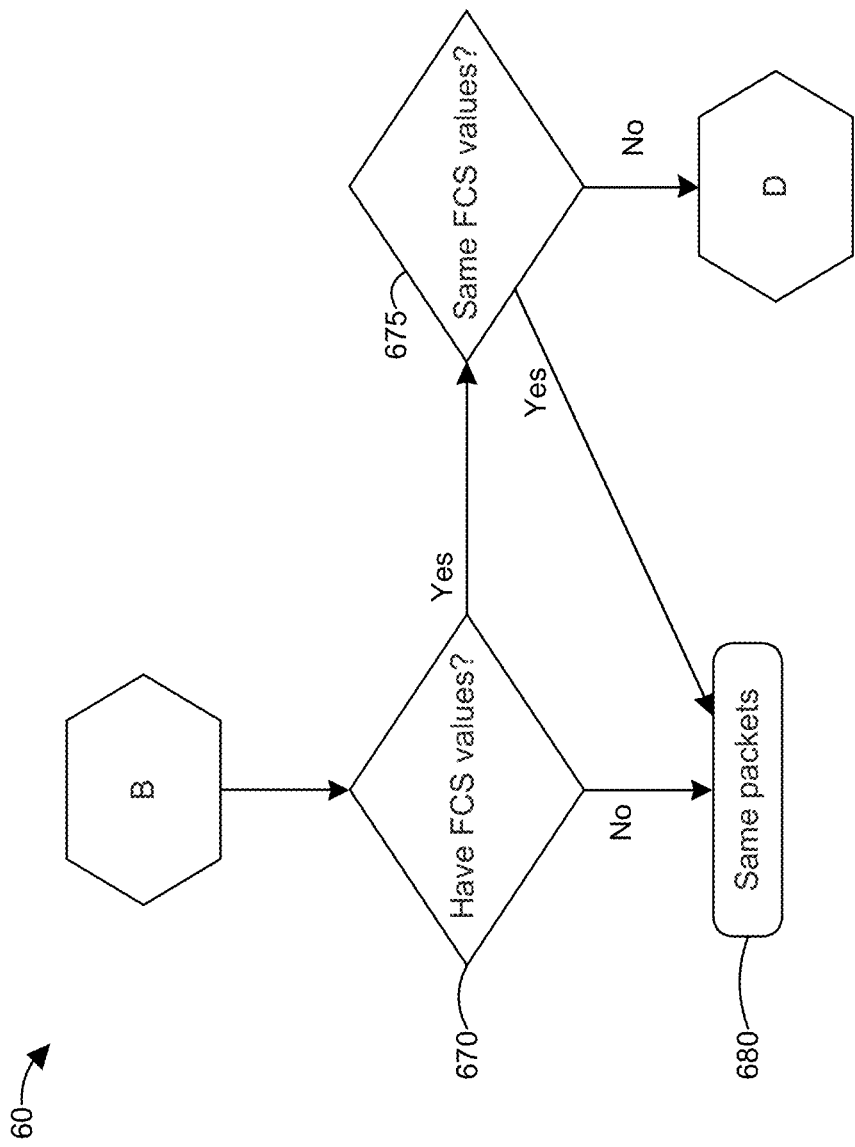

FIG. 6 is a flow chart 60 of a method for determining, based on packet information, whether first and second network packets captured by first and second protocol capture engines, respectively, are the same according to an example embodiment. In a preferred embodiment, the first protocol capture engine is a protocol analyzer and the second protocol capture engine is an RF analyzer. One or more protocol capture engines or a computer in communication therewith can perform the steps of flow chart 60. For simplicity, flow chart 60 is described with respect to performance by one protocol capture engine (e.g., a protocol analyzer). The steps in flow chart 60 do not need to be performed in the order illustrated in FIG. 6. In step 600, a protocol capture engine determines whether the first and second packets come from the same transmitter, for example by comparing the source address of each packet. If the packets come from the same transmitter, then the protocol capture engine determines in step 510 whether the packets are being sent to the same receiver, for example by comparing the destination address of each packet. If the packets are being sent to the same receiver, then the protocol capture engine determines in step 620 whether the packets are of the same type (e.g., beacons, associations, authentications, data, acknowledgments (ACKs), RTSs, CTSs, FCS pass/fails, and/or another packet type). If the packets are of the same type, flow chart 60 proceeds to step 640 via placeholder A. If the packets are not of the same type (step 620), not sent to the same receiver (step 610), or not from the same transmitter (step 600), then the protocol capture engine determines in step 630 that the packets are not the same.

In step 640, the protocol capture engine determines whether the packets have 802.11 sequence numbers. If so, the protocol capture engine determines whether the packets have the same 802.11 sequence numbers in step 645. If the packets have the same 802.11 sequence numbers (step 645) or the packets do not have 802.11 sequence numbers (step 640), the flow chart 60 proceeds to step 650 to determine whether the packets are TCP packets. If so, the protocol capture engine determines whether the packets have the same sequence numbers in step 655. If the packets have the same sequence numbers (step 655) or the packets are not TCP packets (step 650), the flow chart 60 proceeds to step 660 to determine whether the packets are block acknowledgment (ACKs) packets. If so, the protocol capture engine determines whether the packets have the same starting sequence control number in step 665. If the packets have the same starting sequence control number (step 665) or the packets are not block ACKs (step 660), the flow chart 60 proceeds to step 670 via placeholder B. However, if the protocol capture engine determines the packets do not have (a) the same 802.11 sequence numbers (step 645), (b) the same sequence numbers (step 655), or (c) the same starting sequence control number (step 665), then the protocol capture engine determines in step 630 (via placeholder C) that the packets are not the same.

In step 670, the protocol capture engine determines whether the packets have FCS values. If so, the protocol capture engine determines whether the packets have the same FCS values in step 675. If the packets have the same FCS values (step 675) or the packets do not have FCS values (step 670), the protocol capture engine determines the packets are the same in step 680. If the packets are the same, they can be merged or time-aligned (e.g., step 560 in FIG. 5). However, if the packets do not have the same FCS values (step 675), then the protocol capture engine determines in step 630 (via placeholder D) that the packets are not the same.

It is noted that the flow chart 60 in FIG. 6 illustrates an example method for determining whether first and second network packets are the same based on network packet information, and it is not intended to be limiting. Other methods will be apparent to those skilled in the art.

Figure 7:
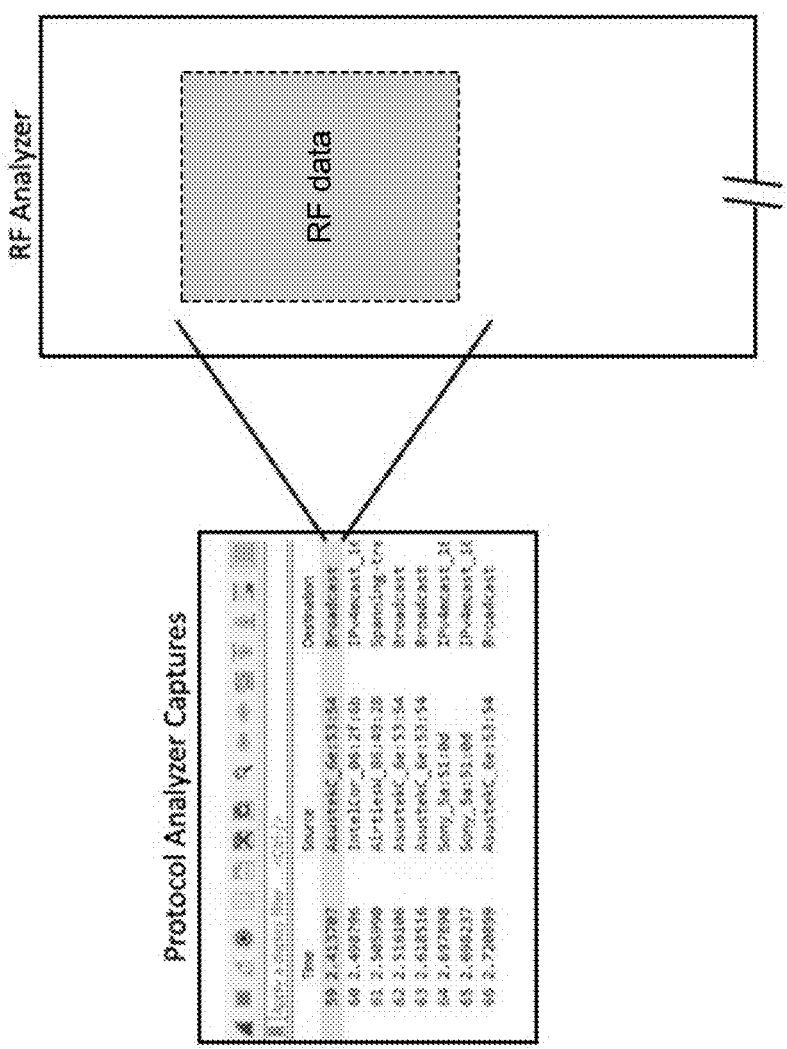
FIG. 7 illustrates how protocol data of a first network packet captured by a protocol analyzer can be synchronized with RF data of a second network packet captured by an RF analyzer.

When the protocol capture engine (e.g., protocol analyzer) determines that the first and second network packets are the same, the first and second network packets can be mapped to each other or synchronized. Thus, the protocol data of the first network packet captured by the protocol analyzer can be synchronized with the RF data of the second network packet captured by the RF analyzer, as illustrated in FIG. 7.

Figure 8:
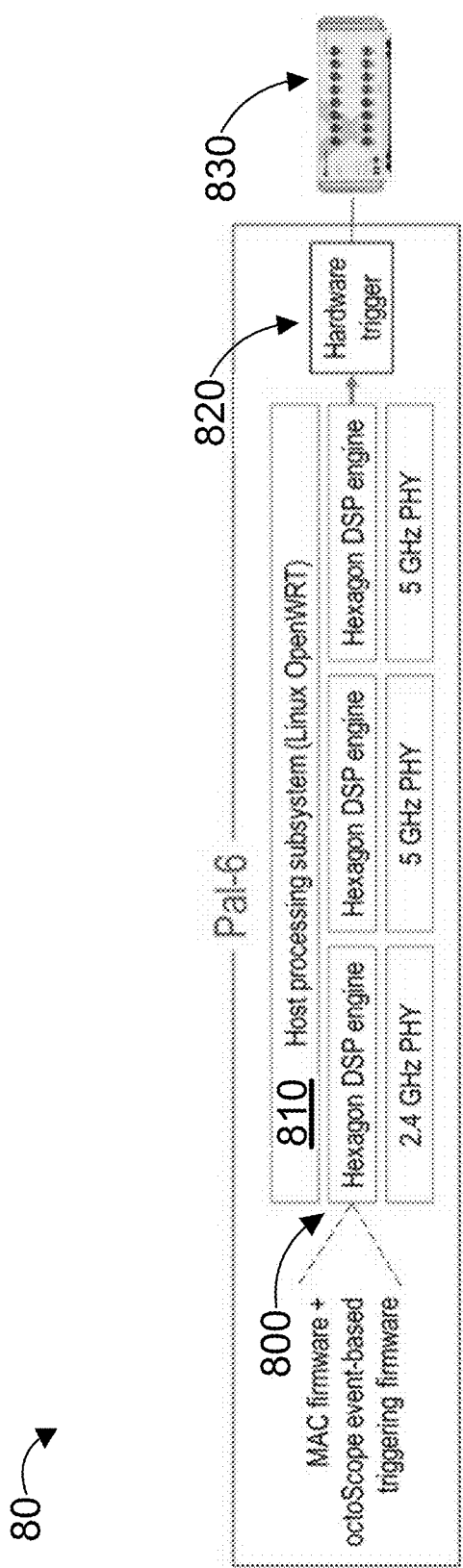
FIG. 8 is a block diagram of a protocol analyzer according to one or more embodiments.

FIG. 8 is a block diagram of a protocol analyzer 80 according to one or more embodiments. The protocol analyzer 80 can include a Pal-6® test instrument available from octoScope, Inc of Littleton, Mass. The protocol analyzer 80 includes digital signal processor (DSP) engines 800, a host processing subsystem 810, and a hardware trigger 820. An example of the host processing subsystem is Linux OpenWRT available from The Open Wrt Project at https://openwrt.org/. The DSP engines 800 run MAC firmware and event-based triggering firmware. The event-based triggering firmware includes executable computer instructions that generate a trigger output signal in response to one or more user-programmable conditions which can be based on the line-rate analysis capabilities of the protocol analyzer 80. When the event-based triggering firmware determines that a user-programmable condition has been satisfied, the protocol analyzer 80 sends a trigger output signal to an RF analyzer 830 (and/or other protocol capture engines) via the hardware trigger 820. The hardware trigger 820 can include a logic signal sent from the protocol analyzer 80 via a coaxial connector. The configuration of what data in the RF analyzer 810 buffer to save pre- and/or post-triggering can be made via an API to the protocol analyzer 80.

Figure 9:
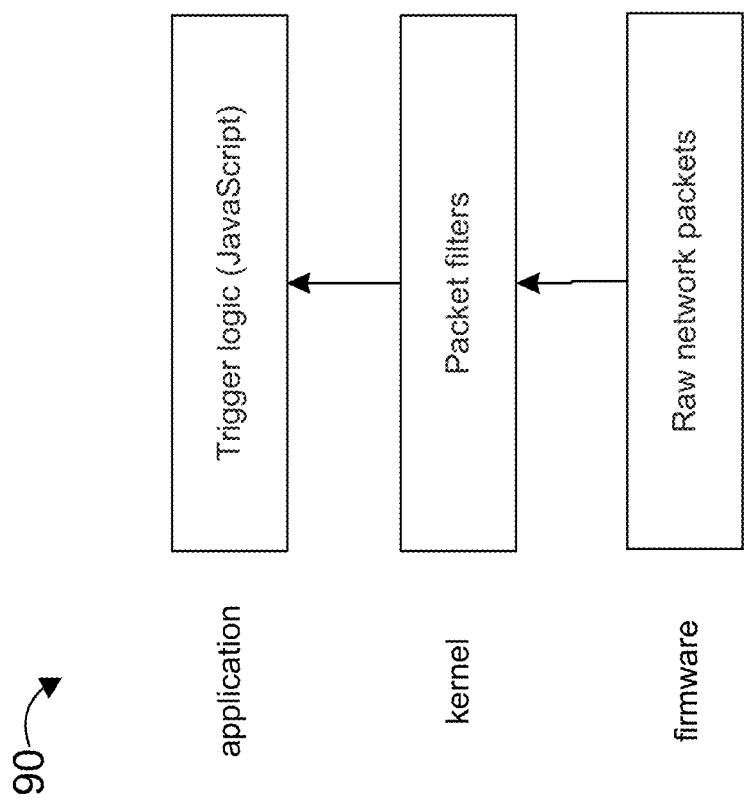
FIG. 9 is a block diagram of the software layer stack in the protocol analyzer according to one or more embodiments.

FIG. 9 is a block diagram of the software layer stack 90 in the protocol analyzer according to one or more embodiments. As illustrated, the software layer stack 80 includes firmware, kernel, and application layers. The firmware layer handles receipt/capture of the raw network packets from the wireless device (e.g., the DUT) and sends the raw network packets to the kernel layer to filter the packets. The filtered packets are then sent to the application layer for analysis to determine whether a trigger rule is satisfied. The trigger rule analysis occurs using trigger logic in JavaScript®, Python™, or another programming language or scripting language. A user can create and/or modify the trigger rule using this programming or scripting language.

Figure 10:
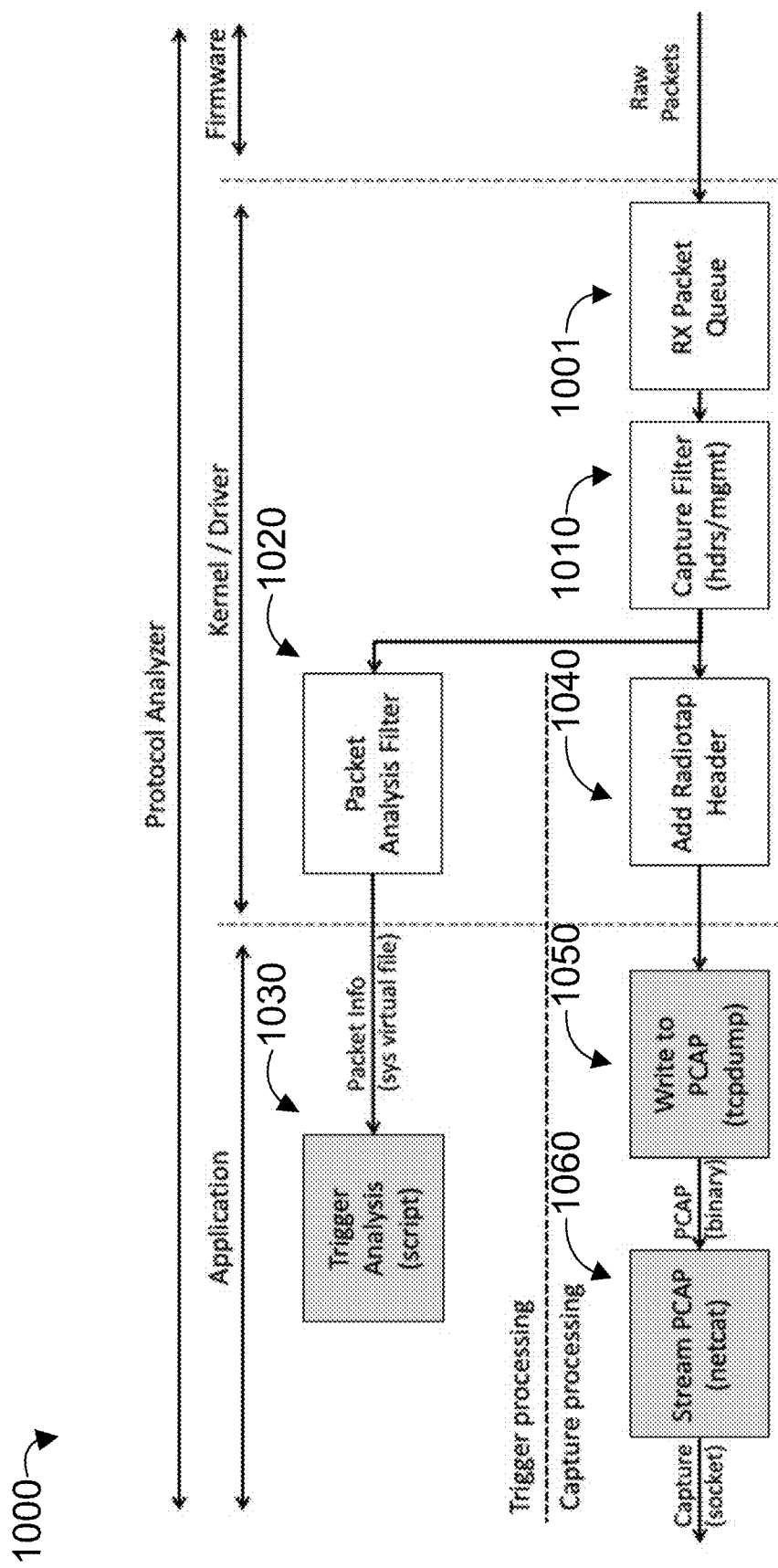
FIG. 10 is a flow chart that illustrates additional details of the software layer stack in the protocol analyzer according to one or more embodiments.

FIG. 10 is a flow chart 1000 that illustrates additional details of the software layer stack in the protocol analyzer according to one or more embodiments. As discussed above, the firmware layer handles receipt/capture of the raw network packets from the wireless device (e.g., the DUT). The raw packets are sent to the kernel/driver layer to filter the packets. First, the raw packets are received in the kernel/driver layer at RX Packet Queue 1001. Next, the raw packets flow into capture filter 1010 that implements high-level fast filtering to determine which packets to further analyze for trigger processing. After the capture filter 1010, the protocol analyzer performs trigger processing of the filtered packets and capture processing of all received packets.

In trigger processing, the protocol analyzer passes the capture-filtered packets through a packet analysis filter 1020 which can further filter the packets based on one or more criteria such as packet type, source address, destination address, frame check sequence (FCS), and/or another property of the packets. The packet analysis filter 1020 can also remove packets to alleviate trigger script processing, and it can filter expressions in the packets (e.g., to/from MAC, packet types, FCS error, etc.). The filtered packets are then sent to the trigger analysis script 1030 in the application layer to determine whether a trigger rule is satisfied.

In capture processing, the protocol analyzers adds a radiotap header 1040 to the received packets to include the identity of the protocol analyzer that captured the raw packets. Next, the protocol analyzer writes 1050 and streams 1060 to PCAP.

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

What is claimed is:

1. A computer-implemented method for synchronizing wireless testing devices, comprising:
   in a first protocol analyzer located in a first RF-isolated test chamber, capturing first network packets transmitted to or from a wireless device-under-test (DUT) to generate first test data;
   in a second protocol analyzer located in a second RF-isolated test chamber, capturing second network packets transmitted to or from the wireless DUT to generate second test data;
   synchronizing internal clocks of the first and second protocol analyzers such that the first and second protocol analyzers capture the first and second network packets with respect to a synchronized internal clock time;
   merging the first and second captures using the synchronized internal clock time; and
   in the first protocol analyzer, generating a trigger output signal when any of the first network packets satisfies a trigger rule,
   wherein the trigger output signal comprises a start trigger output signal that causes the second protocol analyzer to start storing the second test data.

2. The method of claim 1, wherein the internal clocks are synchronized using a clock synchronization protocol.

3. The method of claim 2, wherein the clock synchronization protocol comprises a Network Time Protocol.

4. The method of claim 2, wherein the clock synchronization protocol comprises a Precision Time Protocol.

5. The method of claim 1, wherein the internal clocks of the first and second protocol analyzers are synchronized to an internal clock of a computer, the computer in network communication with the first and second protocol analyzers.

6. The method of claim 1, wherein the first protocol analyzer comprises an in-line probe.

7. The method of claim 6, wherein the first and second protocol analyzers comprise in-line probes.

8. The method of claim 1, wherein the first protocol analyzer comprises a monitor probe.

9. The method of claim 8, wherein the first and second protocol analyzers comprise monitor probes.

10. The method of claim 1, wherein the trigger output signal comprises a stop trigger output signal that causes the second protocol analyzer to stop storing the second test data.

11. The method of claim 1, wherein the trigger rule is user-programmable in a scripting language.

12. The method of claim 1, further comprising, prior to determining whether the trigger rule is satisfied, passing the first network packets through a packet analysis filter, the packet analysis filter configured to extract packet information from the first network packets and filter the first packets based on the packet information.

13. The method of claim 1, further comprising, in a computer in network communication with the first and second protocol analyzers:
   receiving the first test data from the first protocol analyzer;
   receiving the second test data from the second protocol analyzer;
   generating a distributed trigger output signal when the first and second network packets satisfy a distributed trigger rule; and
   simultaneously sending the distributed output signal to the first and second protocol analyzers.

14. The method of claim 13, wherein the distributed trigger output signal comprises a start trigger output signal.

15. The method of claim 13, wherein the distributed trigger output signal comprises a stop trigger output signal.

16. The method of claim 13, wherein the distributed trigger rule is user-programmable in a scripting language.

17. The method of claim 1, further comprising, in a computer in network communication with the first and second protocol analyzers:
   receiving the first test data from the first protocol analyzer; and
   merging the first and second captures, using the synchronized internal clock time, at the computer.

18. A system for testing wireless devices, comprising:
   RF-isolated chambers; and
   a protocol analyzer disposed in each RF-isolated chamber, the protocol analyzers in network communication with each other,
   wherein:
      internal clocks of the protocol analyzers are time-synchronized according to a time synchronization protocol, each protocol analyzer is configured to capture network packets transmitted to or from a wireless device-under-test (DUT) to generate test data, the protocol analyzers comprise a first protocol analyzer and one or more additional protocol analyzers, and the first protocol analyzer is configured to:
determine if any of the network packets captured by the first protocol analyzer satisfies a trigger rule, and simultaneously send a trigger output signal to the one or more additional protocol analyzers when the trigger rule is satisfied.

19. The system of claim 18, further comprising a computer in network communication with the protocol analyzers, wherein:
the computer receives the test data from each protocol analyzer, and
the computer merges the test data using the synchronized internal clocks.

20. The system of claim 19, wherein the computer is configured to:
determine whether any of the network packets in the merged test data satisfy a distributed trigger rule, and
simultaneously send a distributed trigger output signal to the protocol analyzers when the distributed trigger rule is satisfied.

21. The system of claim 20, wherein the computer sends the distributed trigger output signal to the protocol analyzers via trigger lines.

22. The system of claim 20, wherein the distributed trigger rule is user-programmable in a scripting language.

23. The system of claim 18, wherein the first protocol analyzer sends the trigger output signal to the one or more additional protocol analyzers via one or more trigger lines.

24. The system of claim 18, wherein the trigger output signal comprises a start trigger output signal.

25. The system of claim 18, wherein the trigger output signal comprises a stop trigger output signal.

26. The system of claim 18, wherein the trigger rule is user-programmable in a scripting language.

27. The system of claim 18, wherein the first protocol analyzer comprises a packet analysis filter configured to extract packet information from the first network packets and filter the first network packets based on the packet information.

28. The system of claim 27, wherein the packet analysis filter has a filtered network packet output and the first protocol analyzer determines if any of the first network packets in the filtered network packet output satisfies the trigger rule.

29. A computer-implemented method for synchronizing wireless testing devices, comprising:
in a first protocol analyzer located in a first RF-isolated test chamber, capturing first network packets transmitted to or from a wireless device-under-test (DUT) to generate first test data;

in a second protocol analyzer located in a second RF-isolated test chamber, capturing second network packets transmitted to or from the wireless DUT to generate second test data;

synchronizing internal clocks of the first and second protocol analyzers such that the first and second protocol analyzers capture the first and second network packets with respect to a synchronized internal clock time;

merging the first and second captures using the synchronized internal clock time; and in a computer in network communication with the first and second protocol analyzers:
receiving the first test data from the first protocol analyzer;
receiving the second test data from the second protocol analyzer;
generating a distributed trigger output signal when the first and second network packets satisfy a distributed trigger rule; and
simultaneously sending the distributed output signal to the first and second protocol analyzers.

30. The method of claim 29, wherein the distributed trigger output signal comprises a start trigger output signal.

31. The method of claim 29, wherein the distributed trigger output signal comprises a stop trigger output signal.

32. The method of claim 29, wherein the distributed trigger rule is user-programmable in a scripting language.

33. A system for testing wireless devices, comprising:
RF-isolated chambers;
a protocol analyzer disposed in each RF-isolated chamber, the protocol analyzers in network communication with each other; and
a computer in network communication with the protocol analyzers,
wherein:
internal clocks of the protocol analyzers are time-synchronized according to a time synchronization protocol,
each protocol analyzer is configured to capture network packets transmitted to or from a wireless device-under-test (DUT) to generate test data,
the computer receives the test data from each protocol analyzer,
the computer merges the test data using the synchronized internal clocks, and
the computer is configured to:
determine whether any of the network packets in the merged test data satisfy a distributed trigger rule, and
simultaneously send a distributed trigger output signal to the protocol analyzers when the distributed trigger rule is satisfied.

34. The system of claim 33, wherein the computer sends the distributed trigger output signal to the protocol analyzers via trigger lines.

35. The system of claim 33, wherein the distributed trigger rule is user-programmable in a scripting language.

* * * * *